(12) United States Patent
Lu (10) Patent No.: US 7,010,705 B2
(45) Date of Patent: Mar. 7, 2006

(54) METHOD AND DEVICE FOR TRIGGERING POWER SUPPLY SWITCH OF A CORDLESS ELECTRIC-APPARATUS

(75) Inventor: Kuo-Cheng Lu, Taipei (TW)

(73) Assignee: Microlink Communications Inc., Taipei (TW)

( * ) Notice: Subject to any disclaimer, the term of this patent is extended or adjusted under 35 U.S.C. 154(b) by 455 days.

(21) Appl. No.: 10/426,796

(22) Filed: May 1, 2003

(65) Prior Publication Data

US 2004/0221183 A1 Nov. 4, 2004

(51) Int. Cl.
*G06F 1/32* (2006.01)

(52) U.S. Cl. .................. 713/300; 713/323; 713/324

(58) Field of Classification Search ............... 713/300, 713/320, 323, 324, 330
See application file for complete search history.

(56) References Cited

U.S. PATENT DOCUMENTS

| 4,751,625 | A  | * | 6/1988  | Lin ............................. 362/276 |
| 6,265,682 | B1 | * | 7/2001  | Lee ............................. 200/600 |
| 6,639,488 | B1 | * | 10/2003 | Deligianni et al. ......... 333/101 |
| 2004/0008188 | A1 | * | 1/2004 | Liu ............................. 345/177 |

* cited by examiner

Primary Examiner—Dennis M. Butler
(74) Attorney, Agent, or Firm—Rosenberg, Klein & Lee (57) ABSTRACT

A method for triggering a power supply module switch of a cordless electric-apparatus which includes a metal inductive area and an electrostatic inductive element comprising the following steps: when a user body approaches the device to a predetermined distance which is less than the electrostatic induction distance, the electrostatic inductive element detects electrostatic charge from the user body so as to turn a switch within the electrostatic inductive element on; a power supply module supplies power for the cordless electric-apparatus when the switch is turned on; when the user body leaving away from the cordless electric-apparatus exceeds the electrostatic induction distance, the switch within the electrostatic inductive element turns off and when the switch turns off the power supply module supplies a part power for the cordless electric-apparatus.

10 Claims, 10 Drawing Sheets

METHOD AND DEVICE FOR TRIGGERING POWER SUPPLY SWITCH OF A CORDLESS ELECTRIC-APPARATUS

FIELD OF THE INVENTION

The invention generally relates to a method and device for triggering power supply module switch of a cordless electric-apparatus and more particularly to a method and device for triggering the power supply module switch of the cordless hand-held apparatus through inducting electrostatic charge from user body.

BACKGROUND OF THE INVENTION

Generally, while user does not use the cordless hand-held apparatus, the cordless electric-apparatus still consumes power as normal, such consumption is unnecessary. It shortens battery working time, and the user must replace battery frequently.

Thereafter, typical examples for minimizing the power consumption are disclosed. A cordless electric-apparatus utilizes a device having a timer to decrease power consumption. When user stop working, the timer starts timing till a predetermine time expired, the device will change cordless hand-held apparatus working state to a sleep mode in order to decrease power consumption. When the device detects actions that the apparatus was used again like apparatus moved or keys pressed, the device will transmit signal to wake up the apparatus for working as normal. Such device can decrease the power consumption, however, the cordless hand-held apparatus will consume electrical power until the apparatus switching to power saving state or sleep mode.

Other typical examples for minimizing the power consumption is disclosed. A cordless electric-apparatus has a light source emitting a light beam and a detector receiving light beam reflected from user body. Therefore, the apparatus will know whether user is using cordless hand-held apparatus or not. According to the judgment, the apparatus working state was switched to power saving mode. However, disadvantage of the design is that the light source will consume electrical power, and such invention can not judge whether the shield is body or not, that is, when other objects shield the light beam, the cordless hand-held apparatus will be activated.

SUMMARY OF THE INVENTION

An object of the present invention is to provide a method and device for triggering power switch of a cordless electric-apparatus, the method and device control the power supplying through inducting the electrostatic charge from user body, therefore, when user body approaches the device to a predetermine distance which is the farthest distance that electrostatic induction comes into being, the cordless hand-held apparatus will be wake up to work as normal. On the contrary, when user body leaves away from the device exceed the distance, the power supply module will supply a part of power to the cordless hand-held apparatus or stop supplying power to the cordless hand-held apparatus so as to minimize the power consumption of the cordless hand-held apparatus.

Another object of the present invention is to provide a method utilizing electrostatic induction to trigger power switch of a cordless electric-apparatus. When user body approaches an electrostatic inductive device, the power supply module of the cordless electric-apparatus will supply power to the cordless hand-held apparatus. When user body leaves away from the electrostatic inductive device, the power supply module will supply a part of power to the cordless hand-held apparatus or stop supplying power to he cordless hand-held apparatus so as to minimize the power consumption of the cordless hand-held apparatus right away.

The third object of the present invention is to provide a device having an electrostatic inductive device to trigger power switch of a cordless electric-apparatus. The device comprises a metal inductive area placed on the cordless hand-held apparatus, an electrostatic inductive element connects to the metal inductive area and a power supply module connects to the electrostatic inductive device. The electrostatic inductive device controls the power supply module through inducting the electrostatic charge from user body so as to decrease the power consumption.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE INVENTION

Figure 1:
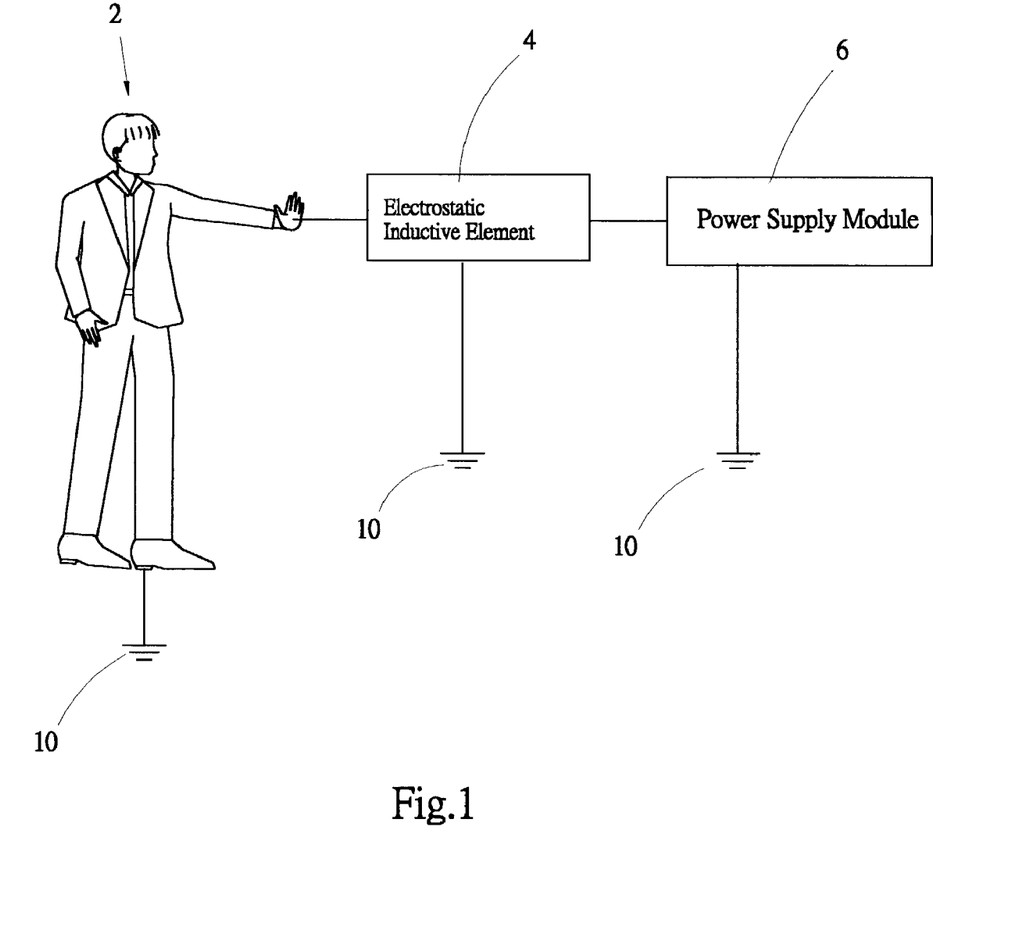
FIG. 1 is a first embodiment of the present invention showing the working principle of the method and device for triggering power supply module switch of a cordless electric-apparatus.

Please refer to FIG. 1. FIG. 1 is a first embodiment showing the working principle of the present invention. A method and device for triggering power supply module switch of a cordless electric-apparatus of the present invention utilizes electrostatic induction to trigger power switch applied in the cordless hand-held apparatus. The present invention provides an electrostatic inductive element 4 connected to a power supply module 6. Both of the inductive element 4 and the power supply module 6 are connected to a grounding 10. The electrostatic inductive element 4 may comprises a metal inductive area (which will be further detailed described in FIGS. 3~10) and inductive electrodes (not shown). While a user body 2 approaches or touches the inductive electrodes of the electrostatic inductive element 4, or the user body 2 approaches or touch the metal inductive area that conducts with the inductive electrodes, electrostatic inductive element 4 will induct electrostatic charge from the user body 2. At the same time, the inductive element 4, the user body 2 and the grounding 10 will buildup a loop, thus, an inductive switch (not shown) within the electrostatic inductive element 4 will be turned on so as to control the power supply module 6 and the cordless electric-apparatus to form a loop. Therefore, the cordless electric-apparatus forms a performance mode for working. On the contrary, the user body 2 leaves away from the inductive electrodes or the metal inductive area of the electrostatic inductive element 4, the loop formed by the electrostatic inductive element 4, the body 2 and the grounding 10 will be cut off. The inductive switch within electrostatic inductive element 4 will also be turned off, and the circuit between the power supply module 6 and the cordless electric-apparatus will be opened, then, the cordless electric-apparatus will stop working right away to be a sleep mode.

Figure 2:
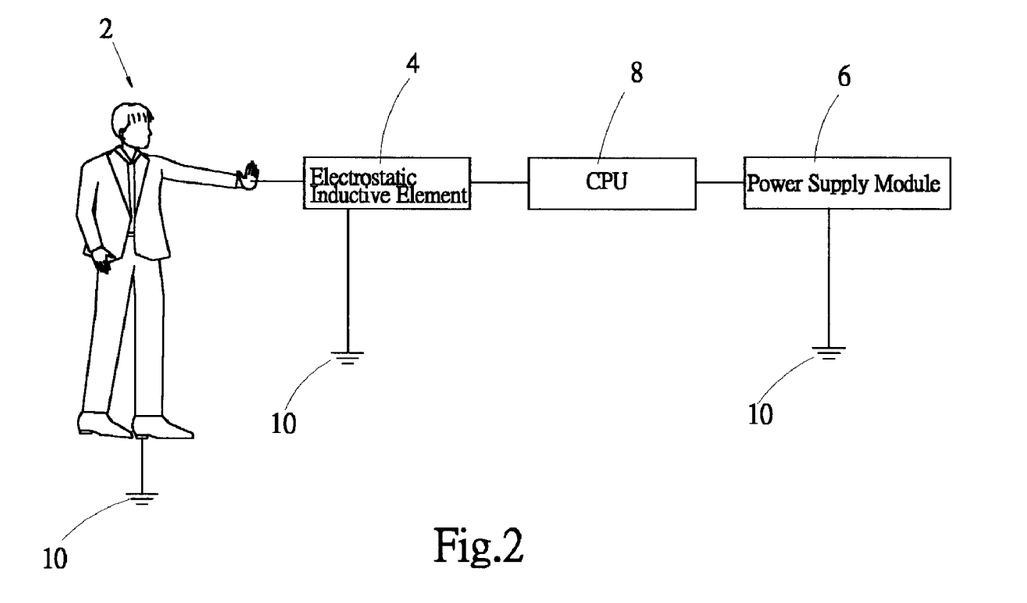
FIG. 2 is a second embodiment of the present invention showing the working principle of the method and device for triggering power supply module switch of a cordless electric-apparatus.

FIG. 2 is a second embodiment showing the working principle of the present invention. The second embodiment comprises an electrostatic inductive element 4, a CPU (Central Process Unit) 8 connected to the electrostatic inductive element 4 and a power supply module 6 connected to the CPU 8. Both of the inductive element 4 and the power supply module 6 are connected to a grounding 10. The CPU 8 controls the power supply module 6 to provide the cordless electric-apparatus with two working mode, that is, performance mode and sleep mode. Under performance mode, the power supply module 6 supplies power for the cordless electric-apparatus. Under sleep mode, the power supply module 6 supplies a part of power for the cordless electric-apparatus. While the user body 2 approaches or touches inductive electrodes of the electrostatic inductive element 4 or the user body 2 approaches or touches a metal inductive area that conducts with the inductive electrodes, the electrostatic inductive element 4 will induct electrostatic charge from the user body 2. The electrostatic inductive element 4, the user body 2 and the grounding 10 will buildup a loop, a inductive switch within the electrostatic inductive element will be turned on, the CPU 8 within cordless apparatus will detect the state that the inductive switch was turned on so as to transmit a command to the power supply module 6 to supply power to the cordless apparatus and will switch to wake up mode. While the user body 2 leaves away from the inductive electrodes or the metal inductive area of the electrostatic inductive element 4, the loop formed by the electrostatic inductive element 4, the user body 2 and the grounding 10 will be cut off. The inductive switch within electrostatic inductive element 4 will also be turned off, the CPU 8 within cordless apparatus will detect the state that the inductive switch was turned off so as to send a command to make the power supply module stopping normal power supply, and the CPU 8 can also send a sleeping command to make the cordless apparatus switch to sleeping mode. Generally, the state of the power supply module 6 is set the same as the state of the electrostatic inductive element 4. Further, the state of the power supply module 6 can be set as reverse to the state of the electrostatic inductive element 4.

Figure 3:
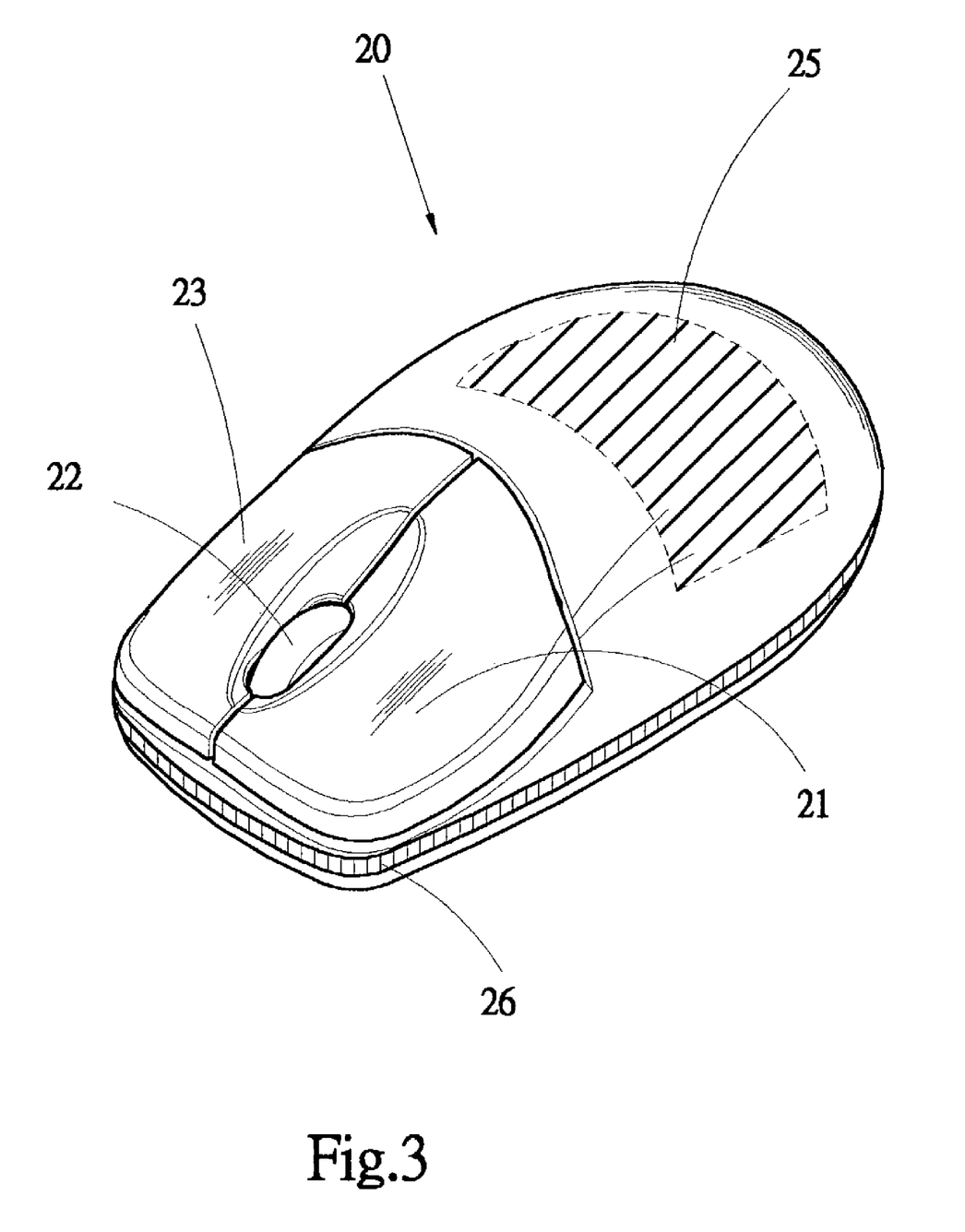
FIG. 3 is a perspective of a mouse which utilizes the device for triggering power supply module switch of the present invention.

Referring to FIG. 3, a cordless mouse 20 utilizes the device of the present invention for triggering power supply module switch. The cordless mouse 20 comprises a left key 21, a right key 23 and a wheel 22 placed on the top of the cordless mouse 20, these components are similar to conventional mouse. The cordless mouse 20 further comprises a first metal inductive area 25 that will induct electrostatic charge from a user palm of the user body 2 located in the rear of the cordless mouse 20; a second metal inductive area 26 that will induct electrostatic charge from user fingers of the user body 2 located in the lateral of the cordless mouse 20. The first metal inductive area 25 and the second metal inductive area 26 directly connect to inductive electrode of the electrostatic inductive element 4 (as illustrated in FIG. 1) within the cordless mouse 20. Therefore, the first and second metal inductive area 25 and 26 will induct electrostatic charge from user body 2 when user body 2 approaches or touches the metal inductive area 25 or 26, the induction produced by the metal inductive area 25 or 26 will be transmitted to the electrostatic inductive element 4, a inductive switch (not shown) within the electrostatic inductive element 4 will be turned on so as to make the power supply module 6 to supply power to the cordless mouse 20. On the contrary, while user body 2 leaves away from the metal inductive area 25, 26, the electrostatic inductive element 4 will detect the change of the electrostatic charge, and the inductive switch within the electrostatic inductive element 4 will be turned off so as to make the power supply module 6 stop supplying power to the cordless mouse 20. Same as described above, while the cordless mouse 20 equipped with the CPU 8, the inductive switch within the electrostatic inductive element 4 will produce a signal, the CPU 8 will detect the signal and will transmit "turn on" or "turn off" command to the power supply module 6 to supply power to the cordless mouse 20 or not. Such arrangement achieves the general expectation of minimizing the power consumption of the cordless mouse 20.

Figure 4:
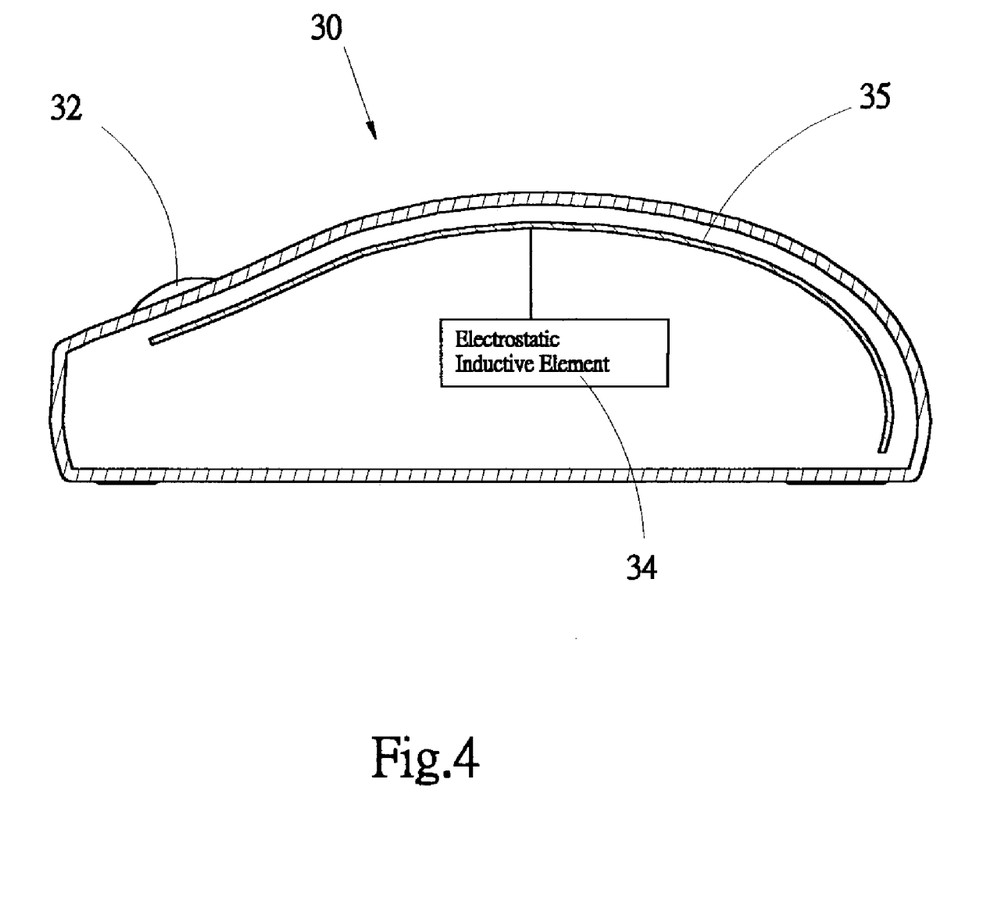
FIG. 4 is a partial cross-sectional view of the mouse similar to the mouse shown in FIG. 3.

FIG. 4 is a cross-sectional view of cordless mouse 30 similar to the cordless mouse 20 shown in FIG. 3. The cordless mouse 30 has a metal inductive area 35 located within cordless mouse 30 and abuts on the top. The metal inductive area 35 directly connects to inductive electrodes of an electrostatic inductive element 34 within the cordless mouse 30. While user palm of the user body 2 approaches or touches the cordless mouse 30, the metal inductive area 35 will induct the electrostatic charge from user body 12. The cordless phone 30 was designed that the shell thickness less than the electrostatic induction distance. An inductive switch (not shown) within the electrostatic inductive element 4 will be turned on so as to make the power supply module 6 supply power to the cordless mouse 30. While the cordless mouse 30 equipped with a CPU 8, the inductive switch within the electrostatic inductive element 4 will produce a signal. The CPU 8 will detect the signal and will send "turn on" or "turn off" command to the power supply module 6 to supply power to the cordless mouse 30 or not. On the contrary, while user body leaves away from the cordless mouse 30, the electrostatic inductive element 4 will detect the change of the electrostatic charge, and the inductive switch within the electrostatic inductive element 4 will be turned off so as to make the power supply module 6 stop supplying power to the cordless mouse 30. Same as described above, while the cordless mouse 30 equipped with a CPU 8, the inductive switch within the electrostatic inductive element 4 will produce a signal for the CPU 8. The CPU 8 will detect the signal and will send "turn off" command to the power supply module 6, the power supply module 6 would not supply power to the cordless mouse 30, and the working mode will be switched to sleep mode. Such arrangement achieves the general expectation of minimizing the power consumption of the cordless mouse 30.

Figure 5:
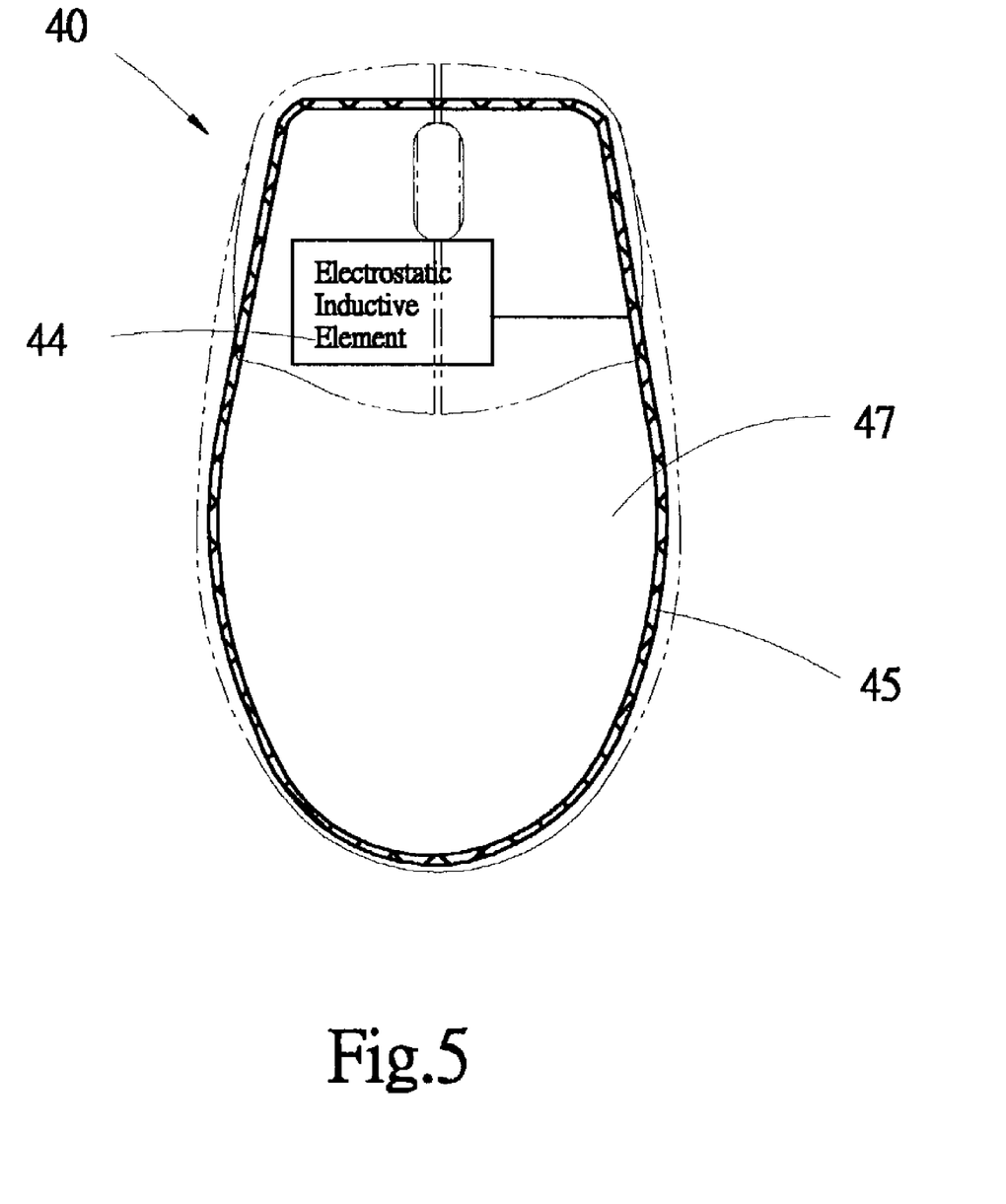
FIG. 5 is a partial cross-sectional view of a mouse in which a metal inductive area of the present invention is formed on a printed circuit board of the mouse.

FIG. 5 shows a cordless mouse 40 in which a metal inductive area of the present invention is formed on a printed circuit board of the cordless mouse 40. The cordless mouse 40 has a PCB (printed circuit board) 47 which shape fits close the shape of cross section of the cordless mouse 40. The PCB 47 abuts on inner sidepiece. A metal inductive area 45 is equipped along the PCB 47 edge and connected to inductive electrodes of an electrostatic inductive element 44 for detecting electrostatic charge from the user body 2. Such arrangements will make the electrostatic inductive element 44 detecting whether the user uses the cordless mouse 40 or not, in order to control the switch of the power supply module 6 to "turn on" or "turn off". Therefore, the expectation of minimizing the power consumption of the cordless mouse 40 was achieved.

Figure 6:
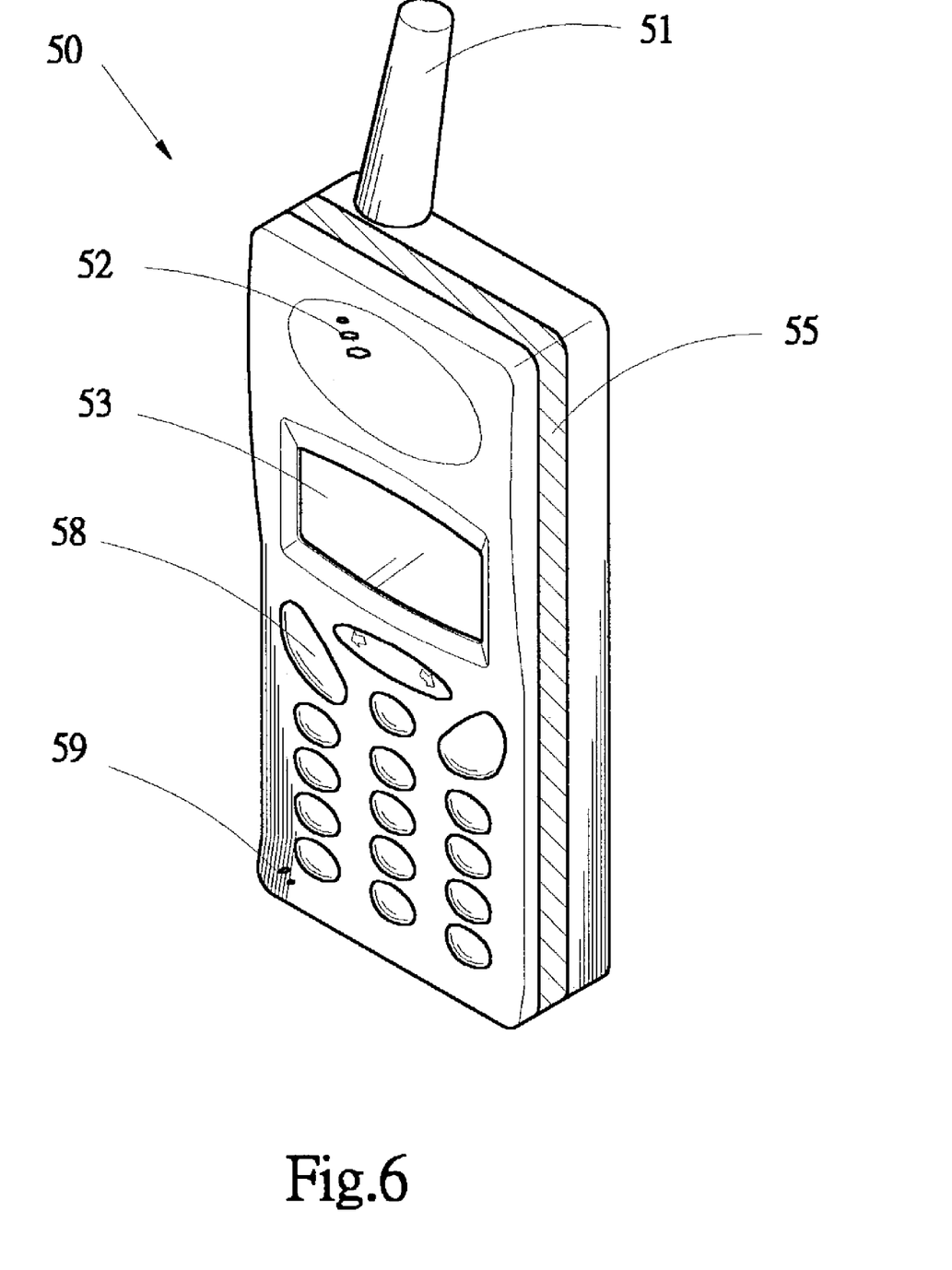
FIG. 6 is a perspective of a cordless phone in which the device of the present invention is utilized.

Referring to FIG. 6, a cordless phone 50 comprises an antenna 51 for receiving and transmitting signals, a headphone 52, a mike 59, a display 53 and keys 58 arranged on a front panel of the cordless phone 50. A metal inductive area 55 surrounds lateral of the cordless phone 50 and connects to the electrostatic inductive element (similar to that shown in FIG. 7) for detecting electrostatic charge from user body 2. While user holding the cordless phone 50, the metal inductive area 55 will detect electrostatic charge from user body 2 so as to turn the inductive switch within the electrostatic inductive element on, therefore, CPU 8 placed on the cordless phone 50 will detect the inductive switch and transmit a signal to power supply module 6 to supply power to the cordless phone 50. Accordingly, operating interface (including lights source, keys control, sound identify and so on) of the cordless phone 50 will be activated and prepared for receiving command from user. While user does not hold the cordless phone 50, the metal inductive area 55 will detect change that electrostatic charge from user body so as to turn the inductive switch within the electrostatic inductive element off, therefore, CPU 8 placed on the cordless phone 50 will detect the inductive switch and transmit a signal and will send "turn off" command to the power supply module 6. The power supply module 6 would not supply power for the operating interface. Thus, the expectation of minimizing the power consumption of the cordless phone 50 was achieved.

Figure 7:
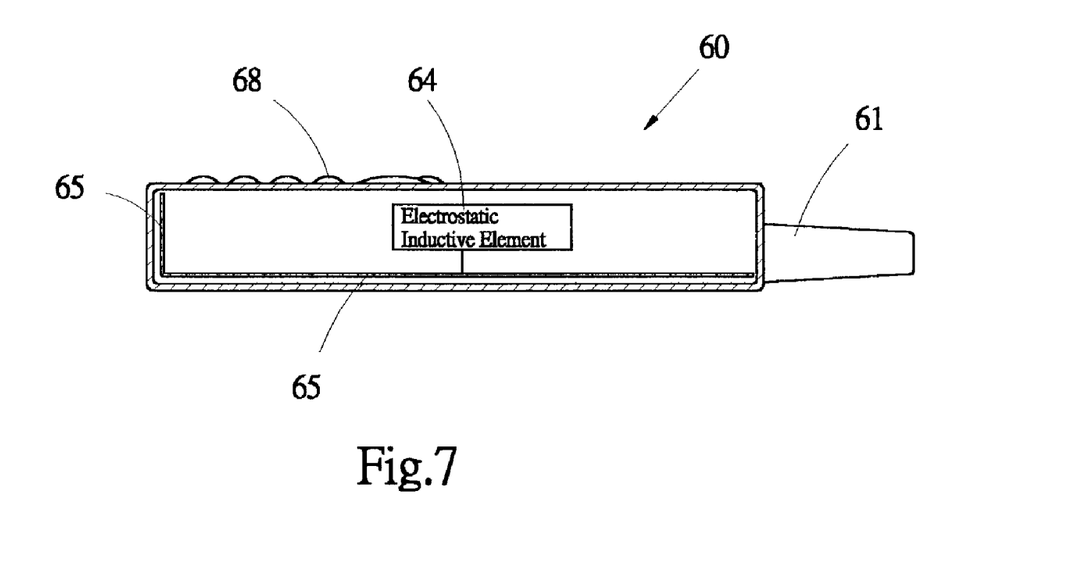
FIG. 7 is a partial cross-sectional of the cordless phone similar to that shown in FIG. 6.

FIG. 7 is a cross-sectional of a cordless phone 60 similar to that shown in FIG. 6. The cordless phone 60 has a metal inductive area 65 located within the cordless mouse 60 and abutted on the rear and the lateral of the cordless mouse 60. An electrostatic inductive element 64 is connected to the metal inductive area 65. The metal inductive area 65 directly connects to inductive electrode of the electrostatic inductive element 64. While user holds the cordless phone 60, for the reason that the cordless phone 60 was designed that the shell thickness less than the electrostatic induction distance, the metal inductive area 65 will detect electrostatic charge from user body 2 so as to turn the inductive switch within the electrostatic inductive element 64 on. Therefore, CPU 8 placed on the cordless phone 60 will detect the inductive switch and transmit a signal to the power supply module 6 to supply power for the cordless phone 60. Accordingly, operating interface (including lights source, keys control, sound identify and so on) of the cordless phone will be activated and prepared for receiving command from users. While user does not hold the cordless phone 60, the metal inductive area 65 will detect change that electrostatic charge from user body 2 so as to turn the inductive switch within the electrostatic inductive element off. Therefore, CPU 8 placed on the cordless phone 60 will detect the inductive switch and transmit a signal to the power supply module 6. The power supply module 6 would not supply power for the operating interface of the cordless phone 60. Thus, the expectation of minimizing the power consumption of the cordless phone 60 was achieved.

Figure 8:
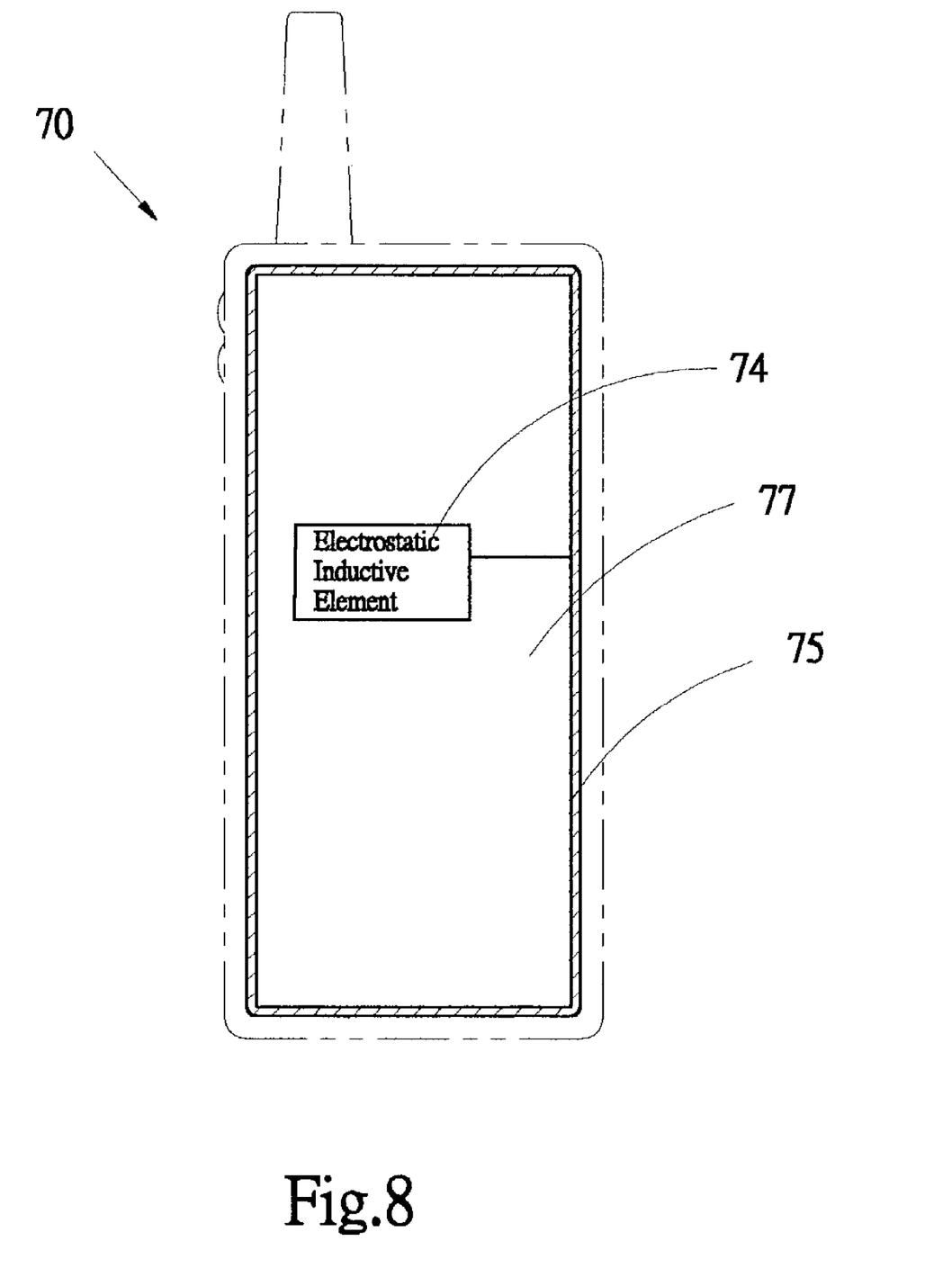
FIG. 8 is a partial cross-sectional of a cordless phone in which a metal inductive area of the present invention is formed on a printed circuit board of a printed circuit board of the cordless phone.

FIG. 8 is a partial cross-sectional of a cordless phone 70. The cordless phone 70 has a PCB (printed circuit board) 77 which shape fits close the shape of cross section of the cordless phone 70. The PCB 77 abuts on inner sidepiece of the cordless phone 70. A metal inductive area 75 is equipped along the edge of the PCB 77 and connects to inductive electrodes of an electrostatic inductive element 74 for detecting electrostatic charge from user body. Such arrangements will make the electrostatic inductive element 74 detecting whether the user using the cordless phone 70 or not in order to control power supply module switch "turn on" or "turn off". So that the expectation of minimizing the power consumption of the cordless phone 70 was achieved.

Figure 9:
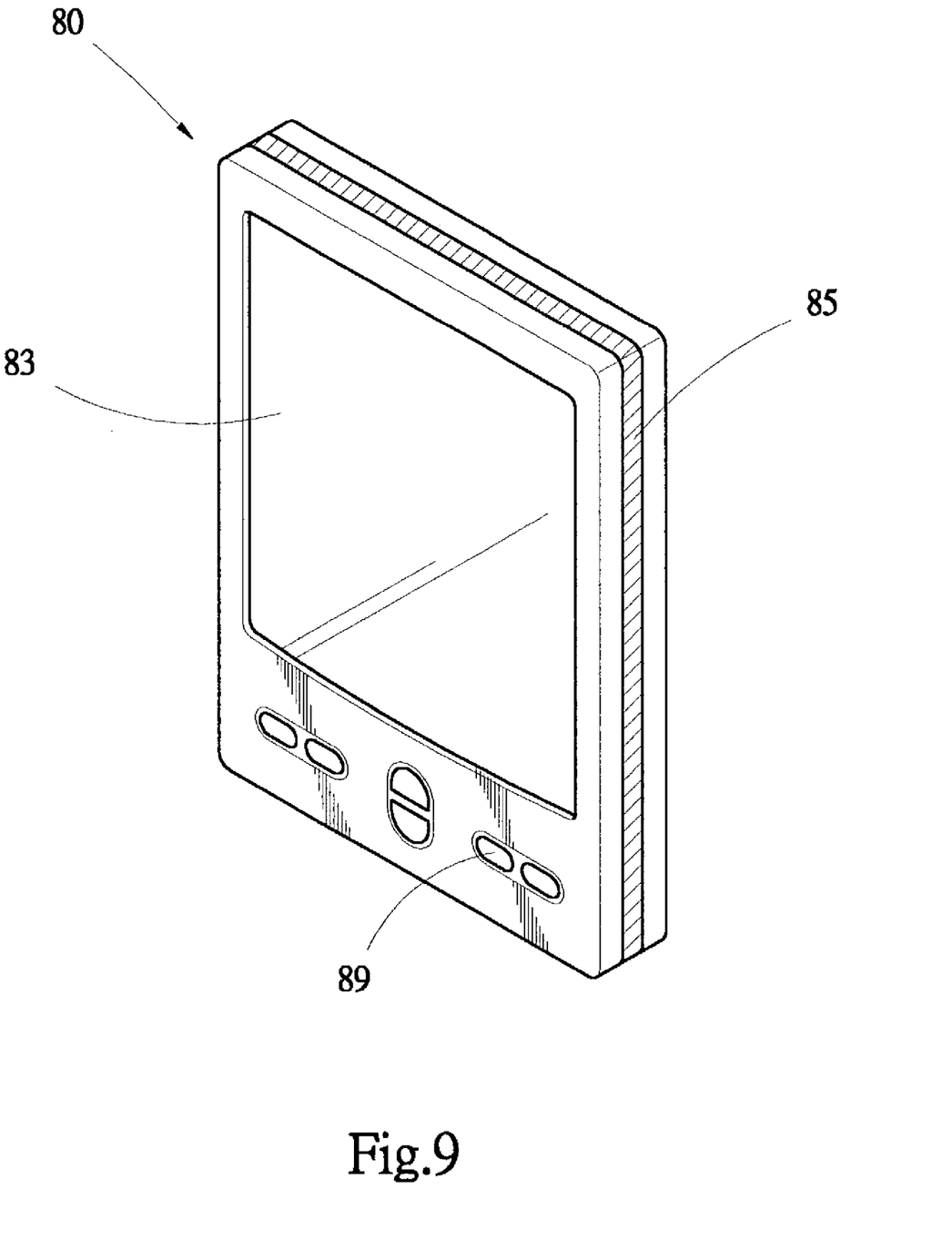
FIG. 9 is a perspective view of a PDA (Personal Digital Assistant) in which the device of the present invention is utilized.

FIG. 9 is a perspective of a PDA (Personal Digital Assistant) 80. The PDA 80 comprises a display screen 83 and several keys 89. A metal inductive area 85 directly connects to the electrostatic inductive element (not shown in FIG. 9) for detecting electrostatic charge from user body 2. The metal inductive area 85 surrounds lateral of the cordless phone 80. While user holds the PDA 80, the metal inductive area 85 will detect electrostatic charge from user body 2 so as to turn the inductive switch within the electrostatic inductive element on. Therefore, CPU 8 placed on the PDA 80 will detect the inductive switch and transmit a signal to power supply module 6 to supply power to the PDA 80. Accordingly, operating interface (including lights source, keys control, and so on) of the PDA 80 will be activated and prepared for receiving command from users. While user does not hold the PDA 80, the metal inductive area 85 will detect change that electrostatic charge from user body 2 so as to turn the inductive switch within the electrostatic inductive element off. Therefore, CPU 8 placed on the PDA 80 will detect the inductive switch and transmit a signal to the power supply module 6. The power supply module 6 would not supply power for the operating interface of the PDA 80. Thus, the expectation of minimizing the power consumption of the PDA was achieved.

Figure 10:
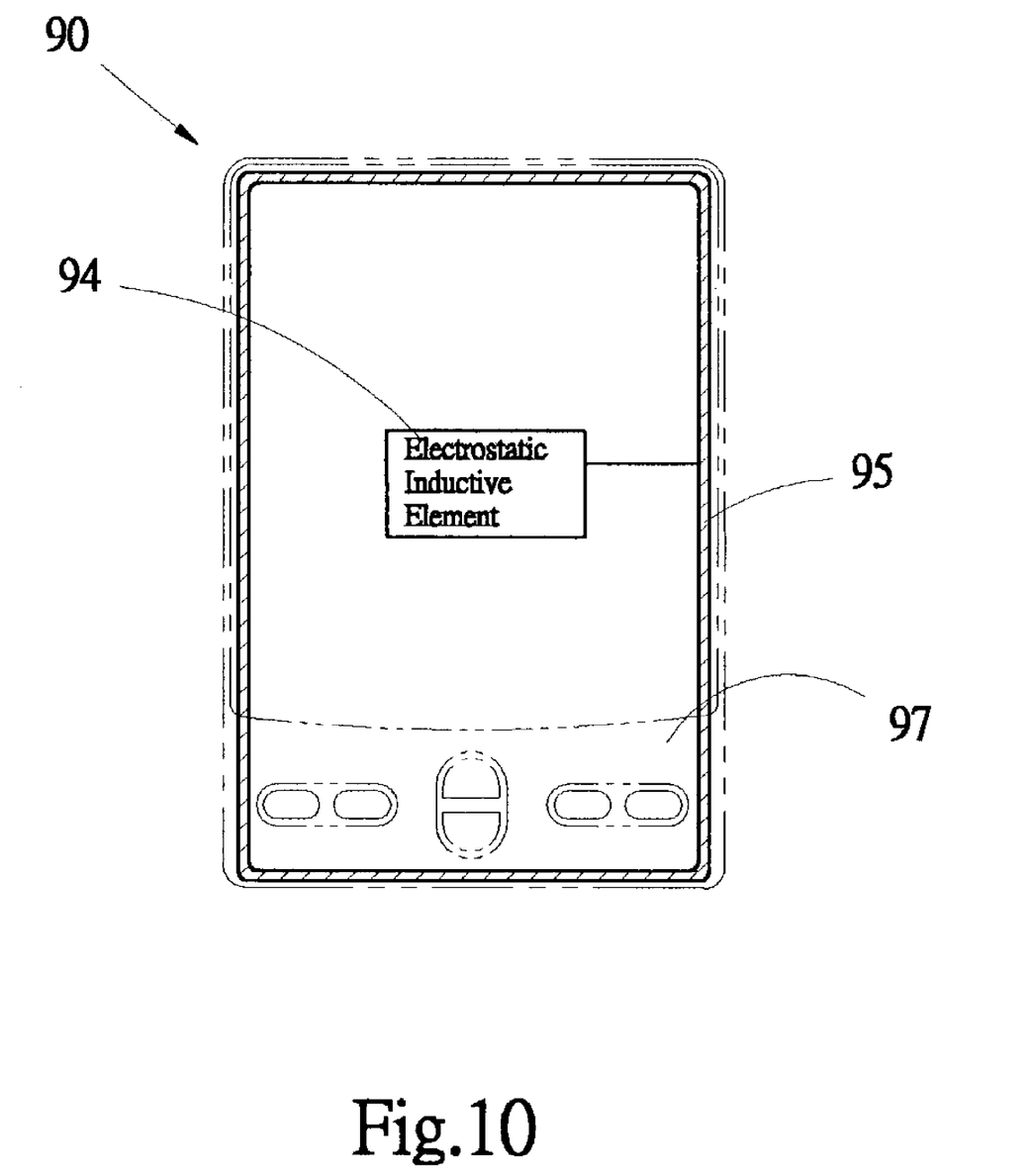
FIG. 10 is a partial cross-sectional of the PDA in which a metal inductive area of the present invention is formed on a printed circuit board of the PDA.

FIG. 10 is a partial cross-sectional of a PDA 90. The PDA 90 has a PCB (printed circuit board) 97 which shape fits close the shape that cross section of the PDA 90. The PCB 97 abuts on inner sidepiece of the PDA 90. A metal inductive area 95 is equipped along the edge of the PCB 97 and connects to inductive electrodes of the electrostatic inductive element 94 for detecting electrostatic charge from user body 2. Thickness of the shell of the PDA 90 was less than the electrostatic induction distance. While user holds the PDA 90, the metal inductive area 95 will detect electrostatic charge from user body 2 so as to turn the inductive switch within the electrostatic inductive element 94 on. Therefore, the PDA 90 will quickly detect whether or not the user using the PDA 90 so in order to control the power module 6 to supply power to the PDA 90. The expectation of minimizing the power consumption of the PDA 90 was achieved.

The method and device for triggering power supply module switch of a cordless electric-apparatus of the present invention will not supply power as normal except electrostatic inductive element's inductive switch was turn on, therefore, it is sure that cordless hand-held apparatus will achieve the expectation of minimizing the power consumption.

This invention has been described with reference to specific embodiments, this description is not to be construed in a limiting sense. For example, those skilled in the art will recognize modifications and alterations which may be made to the embodiments illustrated herein. However, it is contemplated that such modifications can be made without departing the scope and spirit of the invention as defined in the following claims.

What is claimed is:

1. A method for triggering power supply module switch of a cordless electric-apparatus which includes a metal inductive area and an electrostatic inductive element comprising the following steps:
   a. when user body approaches the device to a predetermine distance which is less than the electrostatic induction distance, said electrostatic inductive element detecting electrostatic charge from user body so as to turn a switch within the electrostatic inductive element on;
   b. according to the switch turned on, a power supply module supplying power for the cordless electric-apparatus;
   c. when user body leaving away from the cordless electric-apparatus exceed the electrostatic induction distance, the switch within the electrostatic inductive element being turned off; and
   d. according to the switch within the electrostatic inductive element turned off, the power supply module supplying a part power for the cordless electric-apparatus.

2. The method for triggering power supply module switch of a cordless electric-apparatus as claimed in claim 1, wherein the state of the power supply module can be set as reverse to the state of the electrostatic inductive element.

3. The method for triggering power supply module switch of the cordless electric-apparatus as claimed in claim 1, wherein a CPU within the cordless electric-apparatus controls the power supply module to provide the cordless electric-apparatus with performance mode and sleep mode.

4. The method for triggering power supply module switch of a cordless electric-apparatus as claimed in claim 1, wherein user body leaves away from the cordless electric-apparatus, the power supply module will supply a part of power for the cordless hand-held apparatus.

5. A device for triggering power supply module switch of a cordless electric-apparatus comprising:
   a metal inductive area placed on the shell of the cordless electric-apparatus;
   an electrostatic inductive element having an inductive electrode connected to the metal inductive area, so as to detect whether the distance between user body and the metal inductive area less than the electrostatic induction distance; and
   a power supply module connecting to the electrostatic inductive element,
   when the distance between user body and the metal inductive area is less than the electrostatic induction distance, the power supply module supplies power for the cordless electric-apparatus to be a performance mode; and
   when the distance between user body and the metal inductive area is not less than the electrostatic induction distance, the power supply module supplies a part of power for the cordless electric-apparatus to be a sleep mode.

6. The device for triggering power supply module switch of a cordless electric-apparatus as claimed in claim 5, further comprising a CPU connected between the electrostatic inductive element and the power supply module to control the power supply module for providing the cordless electric-apparatus with a performance mode and sleep mode.

7. The device for triggering power supply module switch of a cordless electric-apparatus as claimed in claim 5, wherein the cordless electric-apparatus has a PCB printed circuit board which shape fits close the shape that cross section of the cordless electric-apparatus and abuts on inner sidepiece of the cordless electric-apparatus, the metal inductive area is equipped along the PCB edge.

8. The device for triggering power supply module switch of a cordless electric-apparatus as claimed in claim 5, wherein the cordless electric-apparatus is a cordless mouse.

9. The device for triggering power supply module switch of a cordless electric-apparatus as claimed in claim 5, wherein the cordless electric-apparatus is a cordless phone.

10. The device for triggering power supply module switch of a cordless electric-apparatus as claimed in claim 5, wherein the cordless electric-apparatus is a PDA Personal Digital Assistant.

* * * * *